(12) United States Patent
Oehrke et al.

(10) Patent No.: US 7,284,055 B1
(45) Date of Patent: Oct. 16, 2007

(54) METHOD AND SYSTEM FOR NETWORK REDIRECTING

(75) Inventors: Terry Lee Oehrke, Lee's Summit, MO (US); Scott Christopher Wells, Overland Park, KS (US)

(73) Assignee: Sprint Communications Company L.P., Overland Park, KS (US)

( * ) Notice: Subject to any disclaimer, the term of this patent is extended or adjusted under 35 U.S.C. 154(b) by 390 days.

(21) Appl. No.: 10/767,023

(22) Filed: Jan. 29, 2004

Related U.S. Application Data

(63) Continuation of application No. 09/021,091, filed on Feb. 10, 1998, now Pat. No. 6,735,631.

(51) Int. Cl.
*G06F 15/173* (2006.01)

(52) U.S. Cl. .......... 709/226; 709/201; 709/224; 709/235; 709/239; 709/241; 709/248

(58) Field of Classification Search .......... 709/203, 709/217, 226, 235, 241, 248, 201, 232, 243, 709/244, 250, 239, 224; 718/105; 455/453
See application file for complete search history.

(56) References Cited

U.S. PATENT DOCUMENTS

| | | | |
|---|---|---|---|
| 5,031,089 A * | 7/1991 | Liu et al. ................. | 709/226 |
| 5,283,897 A * | 2/1994 | Georgiadis et al. ......... | 718/105 |
| 5,293,488 A | 3/1994 | Riley et al. | |
| 5,301,324 A | 4/1994 | Dewey et al. | |
| 5,583,996 A | 12/1996 | Tsuchiya | |
| 5,644,720 A | 7/1997 | Boll et al. | |
| 5,774,660 A | 6/1998 | Brendel et al. | |
| 5,774,668 A | 6/1998 | Choquier et al. | |
| 5,812,771 A | 9/1998 | Fee et al. | |
| 5,878,420 A | 3/1999 | de la Salle | |
| 5,881,238 A * | 3/1999 | Aman et al. ................. | 709/226 |
| 5,915,095 A | 6/1999 | Miskowiec | |
| 5,918,021 A | 6/1999 | Aditya | |
| 5,924,097 A * | 7/1999 | Hill et al. ................. | 707/10 |
| 5,926,463 A * | 7/1999 | Ahearn et al. ............. | 370/254 |
| 5,978,845 A | 11/1999 | Reisacher | |
| 6,067,545 A | 5/2000 | Wolff | |
| 6,068,661 A | 5/2000 | Shari | |
| 6,070,191 A * | 5/2000 | Narendran et al. ......... | 709/226 |
| 6,108,782 A * | 8/2000 | Fletcher et al. ............ | 713/153 |
| 6,167,427 A | 12/2000 | Rabinovich et al. | |
| 6,185,619 B1 | 2/2001 | Joffe et al. | |
| 6,330,602 B1 | 12/2001 | Law et al. | |
| 6,400,722 B1 * | 6/2002 | Chuah et al. ................ | 370/401 |

* cited by examiner

*Primary Examiner*—Michael Won

(57) ABSTRACT

A network and method of providing near 100% availability of services is provided. According to one feature, redirectors are implemented to direct network traffic to any of two or more application processors providing the same service. The redirectors are provided in data paths at network access points and at data centers with the application processors. The redirectors re-route traffic to other application processors when one processor is unavailable and load balance between available processors. To load balance, the redirectors collect various network management statistics from the processors to determine the most responsive processor for receiving traffic. The various network management statistics are shared among the redirectors for efficient load balancing.

41 Claims, 3 Drawing Sheets

METHOD AND SYSTEM FOR NETWORK REDIRECTING

CROSS-REFERENCE TO RELATED APPLICATIONS

This application is a Continuation of U.S. patent application Ser. No. 09/021,091, filed on Feb. 10, 1998 now U.S. Pat. No. 6,735,631, which is incorporated herein by reference.

STATEMENT REGARDING FEDERALLY SPONSORED RESEARCH OR DEVELOPMENT

Not Applicable.

BACKGROUND OF THE INVENTION

1. Field of the Invention

This invention generally relates to computer networks. In particular, the invention relates to directing network traffic.

2. Description of Related Art

The Internet is an international network of interconnected government, education and business computer networks. A person at a computer terminal or personal computer with the proper software communicates through the Internet by placing data in an Internet Protocol (IP) packet or datagram. The packet contains, in part, a source address associated with the computer terminal and a destination address associated with the destination of the packet on the Internet. Using Transmission Control Protocol (TCP), transport of the packet is managed.

The packet is transported in the source network (the user's network), the destination network, and any intervening networks using communication software on processors or routers. The routers read the destination address of the packet and forward the packets towards their destinations using various algorithms known in the art.

Intranets are typically corporate networks that may use the same networking or transport protocols as the Internet. Thus, both the Internet and Intranets can be IP networks.

On a typical IP network, a dedicated server or application processor provides access to information in a cohesive fashion. For example, documents are stored in a HyperText Markup Language (HTML), and users of the EP network use Web Browser software to obtain access to the documents. Other standards and protocols may be used for the same and other types of information. A user with Web Browser software enters a domain name associated with a desired application, such as web page content. The domain name is converted to an IP destination address and the user's request is then routed through the IP network or a plurality of IP networks to a server or application processor associated with the desired application. Access is thus gained to the application. The user may then request further information, such as an HTML document or further processing associated with the application. For example, using HyperText Transport Protocol (HTTP), HTML documents are communicated to the user.

The application desired by the user may reside on more than one server where each server is at a location remote from the other server. For example, company A maintains content information on a server on the east coast of the United States and the same content information on a server on the west coast of the United States. Various mechanisms have been developed to direct user's request to one of the two possible servers, some based on the IP traffic or user request load.

The load associated with a plurality of user requests for the same information is balanced and directed using the Domain Name System (DNS). Upon entry of a domain name by a user, the Web Browser software obtains a destination address from a Domain Name server. Based on the location of the user relative to the possible desired servers and/or the number of instances within a particular amount of time one desired server address versus the other has been provided, the Domain Name server provides one of the possible desired servers' addresses as the destination address, such as the application server on the east coast. Typically, the Web Browser software caches the destination address after the first look-up and all subsequent interactions with that desired server bypass the DNS. Thus, DNS operates generally at Open Systems Interconnection (OSI) layer 7 (the applications layer). Due to the cached IP address, if the server becomes unavailable, the user experiences an outage until a new destination address look-up is forced.

Other OSI layer 7 Load balancing solutions include HTTP redirect. These solutions are typically specific to HTTP and cannot load balance all IP traffic. Additionally, Browser bookmarks used for HTTP refer to a particular destination address, not the Uniform Resource Location (URL) (DNS address server), so reconnections through bookmarks attempt to return directly to a particular destination. If the destination is unavailable, the user experiences an outage.

Some known systems provide geographical load balancing and direction at OSI layers 2 and 3 (the datalink and network layers). Thus, IP traffic is balanced and directed with network components, not Web Browser software. For example, Remote Dispatch by Resonate routes IP traffic associated with a particular application and a particular company or customer to one point. A processor at that point then geographically distributes the IP traffic by changing the destination address to one of several geographically remote servers applying the same application for that customer or company. However, as the amount of IP traffic coming into the single point increases, the response time of all of the application servers appears to decrease.

Another OSI layer 2 and 3 load balancing and direction system is Hopscotch by Genuity. Work stations, not in the IP traffic path, are attached to routers. Using agents or software placed on various application servers, information unique to that agent is provided to a central database. The work stations access the database to obtain load data and use the connections with the routers to geographically distribute based on the load data. However, if the central database fails, the system does not properly distribute EP traffic. If one of several servers in the same location becomes unavailable, the system routes IP traffic to other geographical locations and not to the operational servers at the original location. Furthermore, the application servers must be programmed to allow operation of the agent.

These and other problems are associated with the various load balancing and address assigning systems and methods described above. The present invention attempts to solve these problems.

BRIEF SUMMARY OF THE INVENTION

The present invention is directed to a network and method of providing near 100% availability of services. According to one feature of the invention, redirectors are implemented to direct network traffic to any of two or more application processors providing the same service. The redirectors reroute traffic to other application processors when one processor is unavailable and load balance between available processors. According to a second feature, the redirectors collect various network management statistics from the processors to determine the most responsive processor for receiving traffic. According to a third feature, redirectors are provided in data paths at network access points and at data centers with the application processors. Traffic is directed at various locations in the network. According to a fourth feature, the various network management statistics are shared among the redirectors for efficient load balancing.

In a particular first aspect of the invention, a system and method for sharing data between at least first and second redirection processors is provided. At least the first redirection processor is associated with an application server. The first redirection processor collects server statistics from the application server. The first redirection processor sends information responsive to the server statistics to the second redirection processor.

In a second aspect of the invention, a system and method for directing Internet Protocol (IP) requests between at least first and second application servers is provided. The first and second servers apply substantially the same application. A redirector collects first server statistics from the first application server and second server statistics from the second application server. The first and second server statistics include Simple Network Management Protocol (SNMP) Management Information Base (MIB) information. The redirector directs at least one IP request to one of the first and second application servers in response to the first and second server statistics.

In a third aspect of the invention, a network and method for providing network processing associated with a plurality of users is provided. At least first and second processors at a substantially same geographic location apply substantially the same application and operate at substantially the same time. A load processor operatively connects to the first and second processors. The load processor distributes requests from any one of the plurality of users received by the network to one of the first and second processors in response to load balancing information.

In a fourth aspect of the invention, a network and method for redirecting network traffic is provided. A plurality of address processors are placed in a plurality of network traffic paths. A plurality of application servers operatively connect to the plurality of network traffic paths. The application servers apply, in part, substantially the same application. The address processors direct network traffic to particular applications servers in response to load information.

DETAILED DESCRIPTION OF PREFERRED EMBODIMENT

Figure 1:
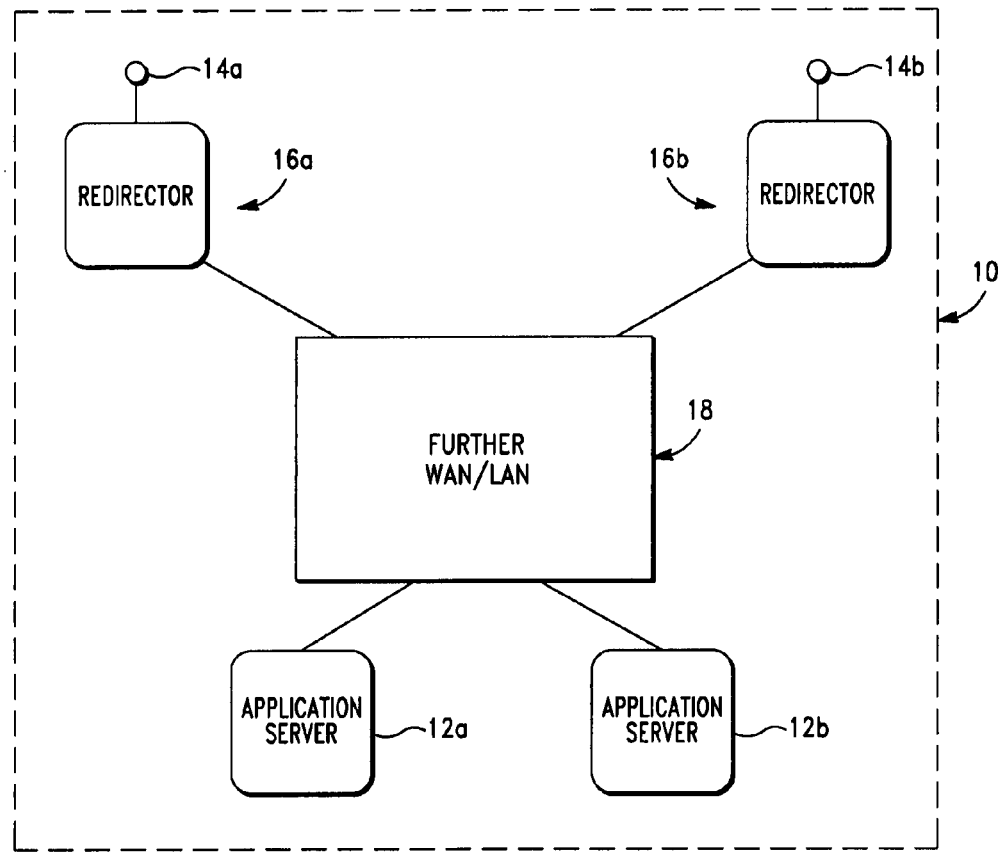
FIG. 1 is a schematic block diagram of one embodiment of a network in accordance with the present invention.
Figure 2:
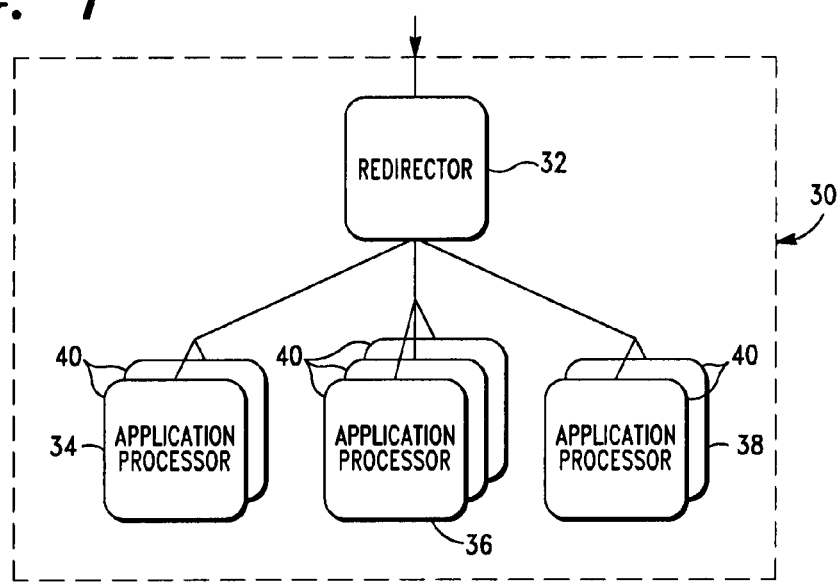
FIG. 2 is a schematic block diagram of an alternate embodiment of a network in accordance with the present invention.
Figure 3:
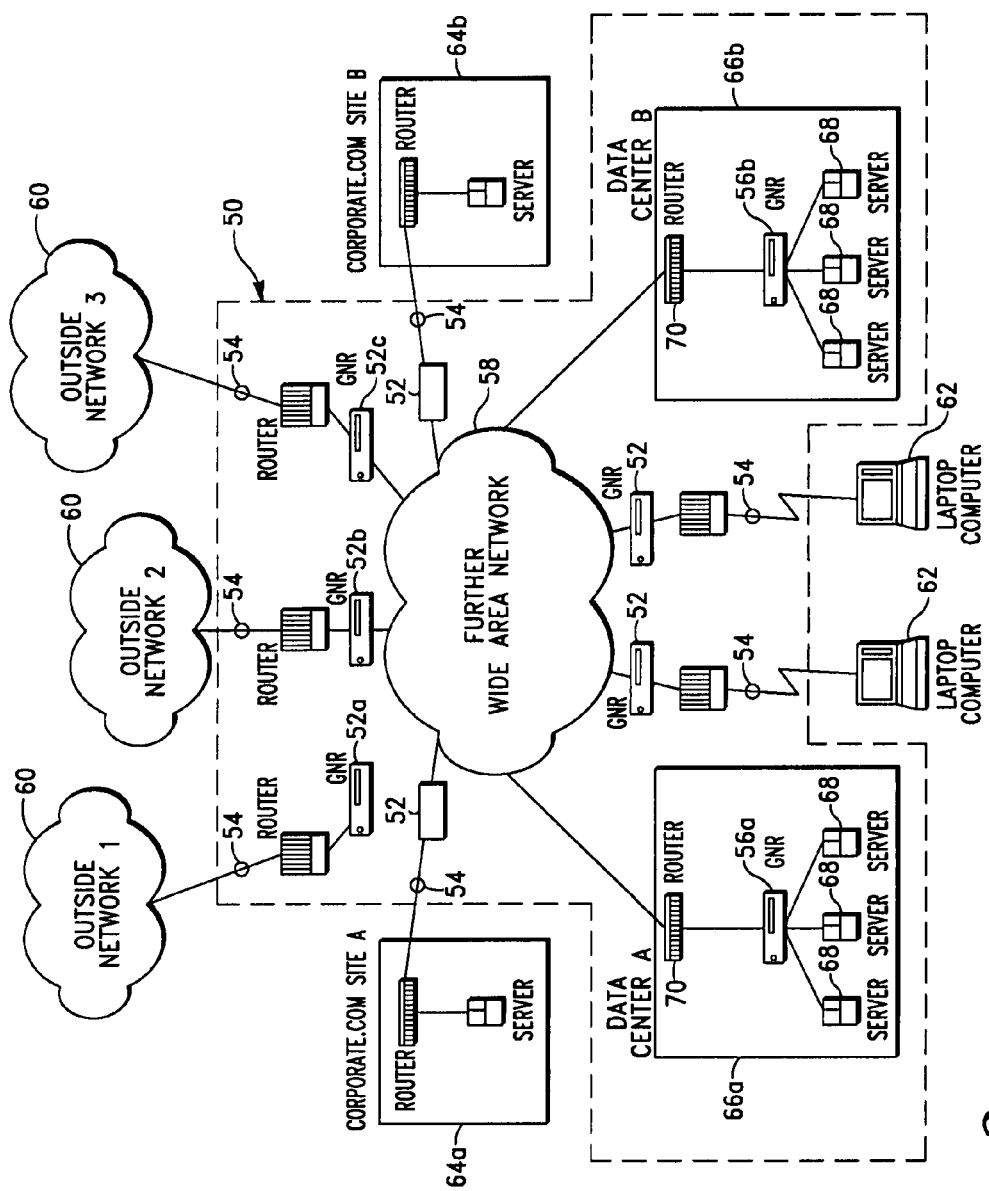
FIG. 3 is a schematic block diagram of another alternate embodiment of a network in accordance with the present invention.

Referring to FIGS. 1-3, networks with efficient network traffic load balancing and network traffic directing are shown. The networks provide near 100% availability by allowing failure in any network component without a user perceived loss in service. In particular, a redirector provides an intelligent redirection of data traffic based on the availability of a data service. The redirector provides local load balancing and fail over for a group of servers and wide area redirection to the closest data center or server handling any particular data type (route requests to the server that can most immediately service the request). Network traffic is directed at OSI layers 2 and 3, so Web Browser caching of a destination address does not result in an outage for the user. If the destination assigned by the Web Browser becomes unavailable, network traffic is directed to another appropriate destination. Furthermore, the networks direct all network traffic, including HTTP, FTP, NNTP, SMTP and other traffic (whether or not IP traffic).

Network traffic is directed in a plurality of data paths within the network to the potentially most responsive server (load balancing), so the response time to user requests may not be slowed. Furthermore, load balancing criteria are easily changed. Standard management data is used as load balancing information, and the load balancing information is distributed to or polled by the various locations from various processors. Thus, network traffic directing is not dependent on agents or a single data base.

Referring now to FIG. 1, a schematic depiction of one embodiment of a network is generally shown at 10. Network 10 includes: network access points (NAPS) 14 connected to redirectors 16. Redirectors 16 connect to applications servers 12 via further WAN/LAN architecture 18. Application servers 12 each may include a processor and data storage, such as a hard disk drive or NFS cabinet, as known in the art. NAPS 14 represent network 10 connections with other networks, other servers or other computers. Redirectors 16 are processors within the IP data path. Alternatively, redirectors 16 are a separate segment on routers. Preferably, redirectors 16 operate with a through-put line speed of 100 Mb/S. Other through-put line speeds may be used.

Network 10, including further WAN/LAN architecture 18, is any of various network structures, such as a Wide Area Network (WAN) or a Local Area Network (LAN). Network 10 may be an IP network or use other protocols.

Typically, network 10 is owned by an Internet Service Provider (ISP), other network provider or a company. Either the owner or a customer of the owner, such as company B as a customer of an ISP, provides services with network 10, such as content or news services. The services may include: mail, news, directory, content, groupware or other applications. Groupware applications include any type of collaborative tool, such as video conferencing and white board software. Various users of network 10, whether employees of the customer or owner or other users, are allowed access to one or more services.

Application servers 12 of network 10 are programmed to provide one or more application services for one or more customers or owners. The two application servers 12 shown in FIG. 1 represent two application servers 12 at the same location or different geographic locations. More application servers 12 may be used. Each application server 12 also represents either a single server, a plurality of servers, or a data center. Data centers may include multiple servers running different or the same applications and various other architecture, such as routers and switches. For a discussion of one data center architecture, see U.S. application No. (unassigned) for a Survivable And Scaleable Data System And Method For Computer Networks, filed herewith Ser. No. 09/021,466. Each application server 12 is dedicated to one or more, such as 33, customers or owners. For one, all or any other subset of the customers or owners, each application server 12 applies substantially the same application. For example, IP content information for company A is applied by application servers 12*a* and 12*b* in different geographical locations. In this example, both application servers 12 operate at substantially the same time to respond to different user requests.

User requests associated with the application are routed as known in the art to network 10. The user requests enter network 10 at NAPS 14. While two NAPS 14 are shown, more or fewer NAPS may be provided. Network traffic, such as IP datagrams or user requests associated with destination addresses within Network 10, are routed to NAPS 14. For example, through DNS processing, a user request's destination address is set as application server 12*a*. In this example, the user request is then routed to one of the NAPS 14 of network 10.

Preferably, a redirector 16 is provided at and associated with every NAP 14 of Network 10. Redirectors 16 operate at OSI layers 2 and 3. Redirectors 16 load balance and/or direct network traffic. Redirectors 16 direct user requests by either leaving the destination addresses the same or changing the destination addresses. For example, a user request with a destination address corresponding to application server 12*a* enters network 10 at NAP 14*b*. The user request passes through redirector 16*b*. Redirector 16*b* either leaves the destination address the same or changes the destination address to correspond to application server 12*b*. Application server 12*b* is preferably applying the same application for the same customer or owner as the application server 12*a*. For each of the many user requests for the one or more applications on the application servers 12, redirectors 16 direct the user requests.

Redirector 16 changes the destination address in order to distribute the load of user requests between application servers 12*a* and 12*b* (applying substantially the same application for a particular customer or owner or as a fail over). Redirectors 16 assess several statistics for each application server 12. Any statistics may be used, including: a hop count, the physical distance to each application server 12, the data rate associated with any connections between redirectors 16 and each application server 12*a*, 12*b*, and round trip travel time of test data sent from redirectors 16 to application servers 12. Additional statistics include Simple Network Management Protocol (SNMP) Management Information Base (MIB) data. The SNMP MIB data includes application server 12 availability (operational), utilization of the Control Processing Unit (CPU) and utilization of the data storage (Input/Output (I/O) statistics). The SNMP MIB data is accessed as known, such as querying application servers 12. Other SNMP MIB data and other statistics may be used.

Redirectors 16 enter various statistics associated with each application server 12*a*, 12*b* into a formula. For each application server 12*a*, 12*b*, a resulting value is determined from the formula. The resulting values are compared to determine the application server 12*a* or 12*b* most appropriate for receiving the user request, such as the application server 12*a* or 12*b* more likely to provide the earliest response. The formula uses all or any subset of the various statistics. Preferably, the formula is programmable, so that the load is distributed as appropriate for any particular network 10. Other than the selection of which statistics to include, various weights may be applied to each statistic. Thus, each statistic is emphasized or de-emphasized in importance for load balancing. The availability statistic is treated as an override statistic. If one of application servers 12*a* or 12*b* is not available, redirectors 16 automatically direct all IP traffic to other application servers 12. Once an unavailable application server 12 becomes available, redirectors 16 then distribute some of the network traffic load to that application server 12.

Once application server 12*a* or 12*b* is selected to receive a particular user request, the user request is routed through other portions, such as further WAN/LAN architecture 18, of network 10, to the appropriate destination, such as application server 12*a* or 12*b*. Application servers 12 then provide processing, such as content processing, as known in the art. Thus, redirectors 16 distributes the load between all possible application servers 12 for efficient processing. The network traffic load may be distributed geographically or between processors at a same or substantially the same geographic location.

Referring to FIG. 2, a schematic depiction of another embodiment of a network depicting the present invention is generally shown at 30. Network 30 includes redirector 32 and three sets of application processors 34, 36 and 38. More or fewer redirectors 32 and sets 34, 36 and 38 of application processors 40 may be used. Fewer or more application processors 40 within a set 34, 36, 38 may also be used. Redirectors 32, application processors 40 or sets 34, 36, 38 may be at various disparate geographic locations. Redirectors 32 may be the same hardware as redirectors 16 of FIG. 1. Some of the processing done by redirector 32 may be different, as discussed below. Other application processor 40 arrangements or data center structures may be used, such as the data center described in U.S. patent application Serial No. (unassigned) for a Survivable And Scaleable Data System And Method For Computer Networks, filed herewith Ser. No. 09/021,466. Application processors 40 may share data on data storage devices, such as NFS cabinets.

In one embodiment, network 30 is at substantially one geographic location. Thus, network 30 represents a data center. Each set 34, 36 and 38 of application processors 40 corresponds to a particular type of application, such as a content application. Each application processor 40 within a set 34, 36 and 38 applies substantially the same application. The application is applied for one or more customers or owners. Each application processor 40 has a unique IP destination address.

Redirector 32 distributes the IP traffic load destined for application processors 40. Instead of placing redirector 32 at an NAP, redirector 32 is positioned to receive the IP traffic associated with application processors 40. For example, user requests for company A content associated with destination addresses corresponding to one of the two application processors 40 in set 34 is provided to redirector 32. Alternatively, the user requests for company A content is provided with the destination address of redirector 32. Upon receipt, redirector 32 then changes the destination address to one of application processors 40 in the appropriate set 34, 36 or 38 as discussed below. Application processors 40 in set 34 apply content applications for company A and any other customers or owners.

Redirector 32 assesses statistics to distribute the network traffic. Preferably, redirector 32 uses SNMP MIB data, such as the CPU utilization, I/O utilization, availability and other information discussed herein, as statistics to distribute the user request load among application processors 40 within sets 34, 36, 38. As discussed above, other statistics may be used. Redirector 32 uses the various statistics in a function or formula with weights to determine the most potentially responsive application processor 40. The statistics used and the weights are both optimized for the particular network 30.

As requests are directed to one application processor 40, the statistics associated with that application processor 40 change. By collecting server statistics periodically, such as every 1 second or minute, requests are directed to the most appropriate available application processor 40 as a function of recently collected statistics.

Redirector 32 also directs information queries generated by any of application processors 40 for information or responses from any of the other application processors 40. For example, an application processor 40 in set 34 applies a content application that requires directory information. The application processors 40 in set 34 generate queries or requests destined for a directory application processor 40, such as in set 38. The query is provided to redirector 32. Redirector 32 directs the query to the appropriate application processor 40 in set 38 as discussed above for user requests.

Preferably, more than one redirector 32 is provided in the data center. The second redirector 32 operates concurrently or acts as a fail over redirector 32. Preferably, a separate Ethernet or other type of port connects between the various redirectors 32. A constant signal is output to verify the status of operation of the other redirectors 32. Based on a selected number of no responses to the output, such as user selected 5 no responses, one of the redirectors 32, such as a fail over redirector 32, takes control and processes for the non-responsive redirector 32. Control over the requests is obtained by broadcasting the IP or other address of the failed redirector 32 to a router and assuming operation for that address. The router routes requests to the active redirector 32 (the fail over redirector 32). Once the failed redirector 32 is available, the processing may either be switched back to the original redirector 32 (the now available but previously failed redirector 32) or the original redirector 32 acts as the fail over redirector 32.

In one embodiment, three redirectors 32 are used in the data center. Two master redirectors and one fail over redirector. Each master redirector is associated with different application processors 40 (server pools). The fail over redirector supports both master redirectors. As more server pools are created, more master redirectors are added. The fail over redirector supports the additional master redirectors or another fail over redirector is added.

FIG. 3 presents an alternate embodiment of a network architecture according to the present invention. The network is generally shown at 50. Network 50 includes: redirectors 52 connected in data paths to each NAP 54 and further WAN 58, and data centers 66 connected to further WAN 58. Data center 66a may be at a different geographical location than the data center 66b. More or fewer data centers 66 may be provided at the same or different geographical locations. Data centers 66 include routers 70, redirectors 56 and servers 68 and any other appropriate components. More than one redirector 56 may be used in each data center 66. Other network 50 architectures and components may be used, such as servers 68 not associated with data center 66. The various components are known or are as described above in reference to FIGS. 1 and 2. Network 50 is preferably a global IP network or a WAN, such as Sprint's® WAN.

Through NAPS 54, network 50 is connected with various outside networks 60, personal computers 62, such as laptop computers, and corporate servers 64. More or fewer NAPS 54 may be used with the same or different types of outside components or networks. Furthermore, corporate servers 64 may be part of network 50.

Within data centers 66, servers 68 are preferably applying the same or substantially the same application for one or more customers or owners. For example, servers 68 apply E-commerce or secure socket layer (SSL) applications for Company B. Other applications and other servers applying those applications within or out of data centers 66 are possible. Redirectors 52, 56 each maintain respective tables corresponding to server 68, 64 addresses, applications and customers/owners.

Also within data centers 66, local redirectors 56 direct traffic, such as user requests for E-commerce applications, and discussed with reference to redirectors 32 of FIG. 2. Thus, redirectors 56 rely on various SNMB MIB information applied to a function with various weights to direct traffic to one of the servers 68 applying the same application for the same customer/owner with the respective data center 66.

Other redirectors 52, or perimeter redirectors, receive all traffic entering network 50. These perimeter redirectors 52 generally direct traffic as described for redirectors 16 in FIG. 1. However, redirectors 52 may avoid examining statistical information where only one server 68, 64 or one data center 66 with a local redirector 56 is capable of providing a response to the user request. As an alternative to receiving all inbound traffic, perimeter redirectors 52 may not be provided for some NAPS 54. For example, redirectors 52 associated with one or more of the corporate servers 64 may not be provided.

Perimeter and local redirectors 52 and 56 balance the traffic entering network 50. Redirectors 52 and 56 balance the traffic by sharing various statistical information. For example, local redirectors 56 obtain the various SNMP MIB information associated with servers 68 in respective data center 66a, 66b. The SNMP MIB or other protocol information may include I/O contention, processor utilization, memory utilization, port availability, round trip speed, packets serviced, and other data. These statistics are then applied to a function, including various weights, to calculate a statistical variable. These variables, such as one for every set of server 68, applying the same service, are provided to or polled by the perimeter redirectors 52. Perimeter redirectors 52 obtain the variables and may obtain other statistics, such as: hop count; physical distance from the perimeter redirectors 52 to the local redirectors 56, data center 66 or servers 68; the data rate of any connections between redirectors 52 and local redirectors 56; a round trip test time for the transfer of data; and the number of previous user requests directed to each of the local redirectors 56 or servers 68. The statistical information collected by the parameter redirectors 52 is applied to a function and various weights. The result of the application to the function is then compared for each of the various local redirectors 56. The comparison is used to select the potentially most responsive local redirector 56. Alternatively, one of the data centers 66 or servers 68, or other network component is selected. As discussed above, the IP destination address associated with the user request is changed or allowed to remain the same for further routing to the selected local redirector 56 or other network component. User requests may also be routed to other servers, such as the corporate servers 64 from the perimeter redirectors 52. The corporate servers 64 may include redundant geographical or local application processing or non-redundant processing.

Local redirectors 56 receive user requests, such as one local director 56a receiving a redirected request. Based on the various statistics collected by local redirector 56*a*, one of the servers 68 is selected to process the user request. As discussed above, the destination address associated with the user request is changed or allowed to stay the same for further routing to the selected server 68.

Perimeter redirectors 52 may also obtain SNMP MIB information or statistics from various servers. For example, where a perimeter or local redirector 52 or 56 is not provided for a server, such as corporate server 64, perimeter redirector 52 obtains the statistics from the corporate server 64. By obtaining these statistics, perimeter redirector 52 directs and balances IP traffic among any redundant servers, such as corporate server 64*a* and corporate server 64*b* (where corporate servers 64*a* and 64*b* are applying substantially the same application).

Various methods may be used to share the server statistic based variables or the server statistics amongst various perimeter and local redirectors 52 and 56. These methods include a peer cycle method, a broadcast TCP method, and a broadcast User Datagram Protocol (UDP) method. Other methods may be used, such as polling as an alternative to broadcasting. Whichever method is used, the information is communicated at various intervals. Shortening the interval allows more immediate response of any of redirectors 52 and 56 to failed connections, redirectors 52, 56, servers 68 and 64 or other components in network 50. For example, availability statistics or other statistical information is exchanged every second.

In the peer cycle method, each perimeter and local redirector 52 and 56 is assigned to a "neighbor" redirector 52 or 56. In this method, there could be no distinction between local redirectors 56 and perimeter redirectors 52. By providing assignments from one redirector 52 or 56 to another redirector 52 or 56 to yet another redirector 52 or 56 in the appropriate sequence, all of the redirectors 52 and 56 are included (assigned a "neighbor"). Each redirector 52 or 56 queries its assigned neighbor redirector 52 or 56. In response to the query, the neighbor redirector 52 or 56 provides the statistical information, such as its own information and any other variables or MIB data stored by that redirector 52 or 56. After a full round of queries, all of the redirectors 52 and 56 store the statistics associated with the other redirectors 52 and 56. For example, perimeter redirector 52*a* periodically queries its neighbor local redirector 56*a*; local redirector 56*a* queries assigned neighbor perimeter redirector 52*b*; perimeter redirector 52*b* queries assigned neighbor perimeter redirector 52*c*; and so on. 52*b* receives statistical information from 52*c*. When redirector 56*a* queries redirector 52*b*, redirector 52*b* provides redirector 56*a* with statistical information associated with redirector 52*c* and redirector 52*b*. When redirector 52*a* queries redirector 56*a*, the redirector 56*a* responds to redirector 52*a* by providing the statistical information associated with redirectors 52*c*, 52*b* and 56*a*.

In the broadcast TCP method, local redirectors 56 gather the various server statistics and broadcast the associated variables to every perimeter redirector 52 using TCP. Each local redirector 56 maintains a table of addresses associated with each perimeter redirector 52. As perimeter redirectors 52 are added or removed, the table is updated. Preferably, a user interface is provided for all of the perimeter and local redirectors 52 and 56 for changing the tables maintained by redirectors 52, 56. For any perimeter redirectors 52 also assigned to collect statistics from a network server or servers not associated with a local redirector 56, such as corporate servers 64, the perimeter redirector 52 also collects server statistics and broadcasts the associated variables.

In the broadcast UDP method, local and/or perimeter redirectors 56 and/or 52 provide the server statistics, such as the variable, to the perimeter redirectors 52 using UDP. Preferably, each local redirector 56 periodically scans network 50 using a protocol designed to identify other redirectors 52, 56. Based on the scan, the table of addresses is updated. Various statistical information is broadcast to and maintained by perimeter redirectors 52. The broadcast UDP method conserves network bandwidth but does not provide the reliability of the broadcast TCP method.

Other than load balancing redirectors 52, 56 may be programmed for various other features associated with directing network traffic. Geographic and localized redirection may be overridden to establish a persistent connection. For example, network traffic may correspond to statefull communications, such as SSL and shopping carts associated with e-commerce. For statefull communications, the same server 64 or 68 must process a sequence of user requests or groups of IP datagrams. Perimeter and local redirectors 52 and 56 direct traffic from the same source to the same server 64 or 68 for a certain amount of time, such as five minutes without a refresh.

The operation of redirectors 52 and 56 may also be overridden to allow for maintenance to any components of network 50. A system administrator instructs redirectors 52, 56 that a particular address is no longer available. Redirectors 52, 56 direct network traffic to other still available components, such as servers 68 applying substantially the same application for the same customer or owner as the unavailable server 68. The component, such as one or more servers 68, may then be serviced. Perimeter redirector 56 may be allowed to send network traffic to either data center 66 or may be directed to send no network traffic to a particular data center 66.

Network 50 of FIG. 3 demonstrates one particular embodiment using redirectors 52, 56. Redirectors 52, 56 may be used in various network configurations, either as local redirectors, perimeter redirectors or a combination local and perimeter redirectors. The various networks may be LAN networks or combinations of more than one network. Networks with different components and architectures may also advantageously use redirectors 52, 56.

Figure 4:
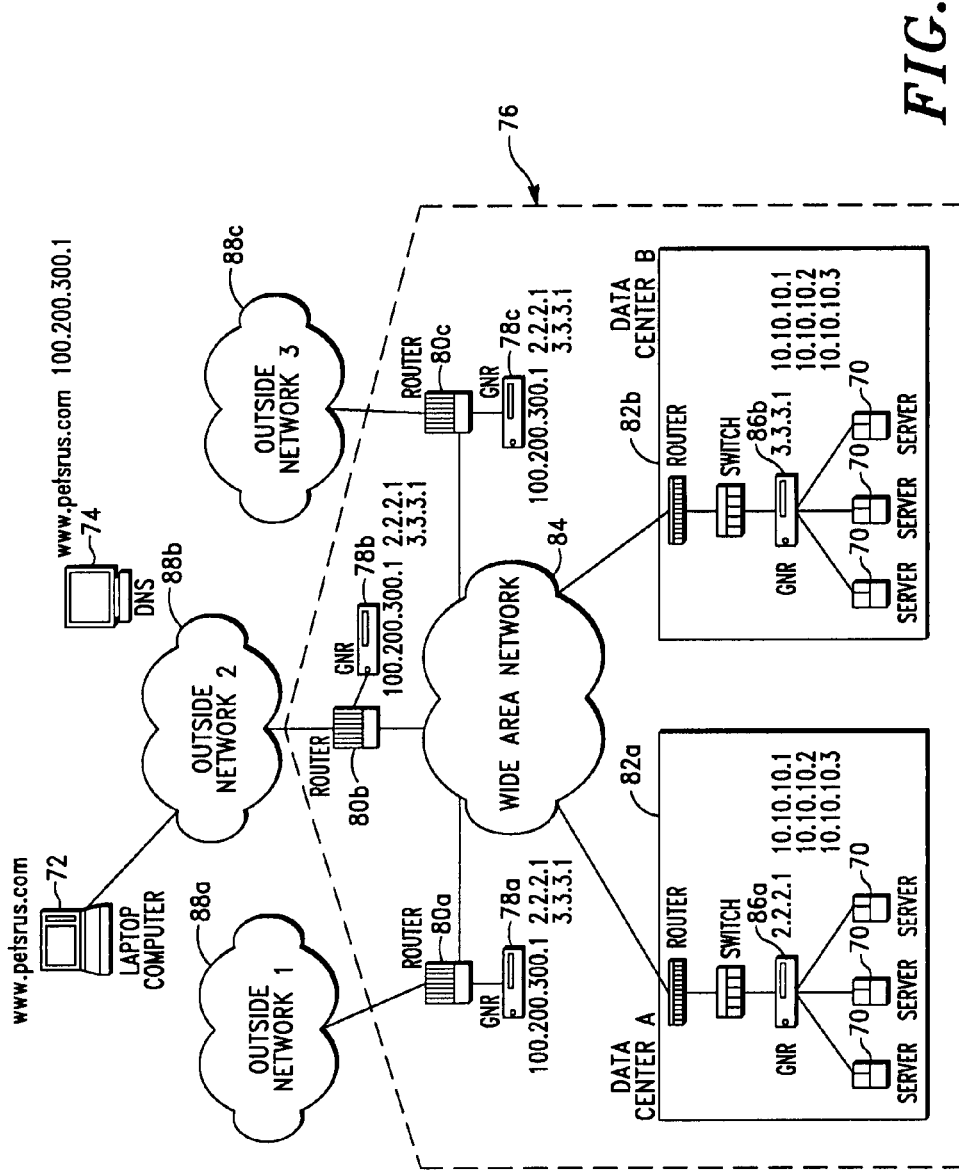
FIG. 4 is a schematic block diagram of another alternate embodiment of a network in accordance with the present invention.

Referring to FIG. 4, an alternative embodiment of the present invention is represented in association with an example. FIG. 4 depicts the data flow from a client entering or requesting petsrus.com to one of servers 70 for servicing the request. The client is represented by computer 72. The request is routed to network 76 associated with the IP address 100.200.300.1 of www.petsrus.com.

Network 76 includes perimeter redirectors 78, routers 80, data centers 82 and wide area network 84. Perimeter redirectors 78 are placed at all entrance points to wide area network 84. Perimeter redirectors 78 may serve two functions. First, they can act as a perimeter redirector as discussed above by collecting local redirector 86 statistics and redirecting traffic to the most available server 70 and/or data center 82. Second, they can operate as local redirectors for servers that are connected directly to the wide area network.

Preferably, perimeter redirectors 78 are connected out of the network traffic data paths to perimeter routers 80 of wide area network 84. The perimeter redirectors 78 are placed adjacent to or on routers 80 that have peering connections to other networks outside the wide area network 84, such as networks 88. Perimeter redirectors 78 are connected on a segment off of each router 80 with the same address class.

Any service for geographic redundancy or load balancing is preferably associated with addresses in the redirector class. This address may reside on all of the perimeter redirectors 78.

Using the example, www.petsrus.com is resolved by DNS 74 to an IP address of 100.200.300.1. The request for 100.200.300.1 enters the perimeter router 80*b* connected to outside network 88*b* requesting transfer to the wide area network 84. The router, using Border Gateway Protocol (BGP), Open Shortest Path First (OSPF) or other routing protocols, stores numerous paths to 100.200.300.1. Router 80*b* selects a route based on the protocol being used. The address associated with the request is sent to the closest perimeter redirector 78*b* from the entrance point of the requester.

Perimeter redirectors 78 collect an MIB value from the local redirectors 86. This single MIB value shows the availability of services (mail, content hosting, news, etc.) within that particular data center 82. This value may be only part of the perimeter equation for selecting the data center 82 for the request. The MIB value determines the availability of the data center 82 and whether or not the data center 82 is operational.

Perimeter redirectors 78 can use a static network database or use the round trip time required to receive the MIB request in order to determine the distance between the requesting redirector 78*a-c* and the closest data centers 82*a* and 82*b*. The static network database may be used as a table to determine the distance from the requesting redirector 78*a-c* to both data centers 82*a* and 82*b*. For example, distance values for each network segment within the wide area network 84 are stored in the table in each redirector 78. Round trip request time measurement may not determine the closest data center 82, but it may indicate the data center 82*a* or 82*b* with the fastest connection between the requesting redirector 78*a-c* and that particular data center 82*a* or 82*b*.

Using the availability indication, any other statistical data and the round trip time and/or the static network database, perimeter redirector 78*b* directs the request to either the closest or the fastest responding data center 82*a* or 82*b* with server availability. Router 80*b* routes the request to the selected data center 82*a* or 82*b*.

If one of the perimeter redirectors 78 fails, perimeter router 80, after accepting the request, routes the request to the next closest redirector 78. This redirector 78 directs the request to the appropriate data center 82.

For services, such as electronic commerce, that require the end user, such as computer 72, to maintain a connection to the same server 70, the perimeter redirectors 78 direct the traffic to the same destination server 70. Preferably, each perimeter redirector 78*a-c* maintains a matrix of source IP to destination IP relationships for a predetermined or selected period of time. Perimeter redirectors 78 may share this matrix and update the appropriate addresses for the defined time period. This process ensures that if a perimeter redirector 78 fails or if the end user's request gets routed into the wide area network 84 through another perimeter router 80, then the redirector 78*a*, 78*b* or 78*c* that receives the request directs the request to the same destination server 70.

Perimeter redirectors 78 may operate as a local redirector 86 at the same time as performing the functions of a perimeter redirector. This allows the perimeter redirectors 78 to directly obtain availability statistics from two or more servers directly connected to the wide area network 84. This function of perimeter redirectors 78 may be useful to load balance traffic and provide failover for two servers in the wide area network 84. Thus, a local redirector is not directly connected to each server. Directly connected local redirectors 86 may be useful for directing traffic within a local pool of servers 70.

The data centers 82 and associated local redirectors 86 direct and process the request (www.petsrus.com) as discussed above. The corresponding response data is routed back to computer 72.

It should be understood that many changes and modifications can be made to the embodiments described above. For example, different locations of redirectors within a data path and different network architectures and protocols may be used. It is therefore intended that the foregoing detailed description be understood as an illustration of the presently preferred embodiments of the invention, and not as a definition of the invention. It is only the following claims, including all equivalents, that are intended to define the scope of the invention.

From the foregoing it will be seen that this invention is one well adapted to attain all ends and objectives hereinabove set forth, together with the other advantages which are obvious and which are inherent to the invention.

Since many possible embodiments may be made of the invention without departing from the scope thereof, is to be understood that all matters herein set forth or shown in the accompanying drawings are to be interpreted as illustrative, and not in a limiting sense.

While specific embodiments have been shown and discussed, various modifications may of course be made, and the invention is not limited to the specific forms or arrangement of parts and steps described herein, except insofar as such limitations are included in the following claims. Further, it will be understood that certain features and sub-combinations are of utility and may be employed without reference to other features and sub-combinations. This is contemplated by and is within the scope of the claims.

What is claimed and desired to be secured by Letters Patent is as follows:

1. A method for sharing data between at least first and second redirection processors, at least said first redirection processor associated with an application server, the method comprising the steps of:
   (a) collecting server statistics from the application server with said first redirection processor, wherein collecting server statistics comprises collecting Simple Network Management Protocol (SNMP) Management Information Base (MIB) information associated with data selected from the group of: availability, processor usage, data storage usage and combinations thereof; and
   (b) sending information responsive to the server statistic from said first redirection processor to said second redirection processor, wherein said second redirection processor is located at a geographically disparate location from said first redirection processor.

2. The method of claim 1 wherein the step (b) comprises sending at least a first variable that is a function of the server statistics.

3. The method of claim 2 wherein the step (b) comprises applying weighting factors to the server statistics.

4. The method of claim 1 further comprising the step (c) of directing Internet Protocol (IP) traffic with the first redirection processor.

5. The method of claim 1 further comprising the step (c) of directing Internet Protocol (IP) traffic with the second redirection processor, the second redirection processor associated with a network access point.

6. The method of claim 1 wherein the step (b) comprises sending the information in response to a query from the second redirection processor.

7. The method of claim 6 wherein the step (b) comprises sending the information to the second redirection processor, the second redirection processor assigned to receive the information from the first redirection processor.

8. The method of claim 1 wherein the step (b) comprises broadcasting the information in a Transmission Control Protocol (TCP) format to a plurality of redirection processors, including the second redirection processor.

9. The method of claim 1 wherein the step (b) comprises broadcasting the information in a User Datagram Protocol (UDP) format to a plurality of redirection processors, including the second redirection processor.

10. A network for sharing load distribution data, the network comprising:
- at least first and second application servers, the first and second application servers applying, in part, substantially the same application;
- a first redirection processor operatively connected to the first and second application servers, the first redirection processor operable to collect server statistics from the first and second application servers, wherein the server statistics comprise Simple Network Management Protocol (SNMP) Management Information Base (MIB) information associated with data selected from the group of: availability, processor usage, data storage usage and combinations thereof;
- a second redirection processor located at a geographically disparate location from the first redirection processor, said second redirection processor operatively connected to the first redirection processor; and
- wherein the first redirection processor is operable to send information responsive to the server statistics to said second redirection processor.

11. The network of claim 10 wherein the information responsive to the server statistics comprises at least a first variable that is a function of the server statistics.

12. The method of claim 11 wherein the variable comprises a variable that is a function of weighting factors applied to the server statistics.

13. The network of claim 10 wherein the first and second redirection processors are operable to direct Internet Protocol (IP) traffic, the second redirection processor associated with a network access point.

14. The network of claim 10 wherein the first redirection processor is operable to send the information in response to a query from the second redirection processor.

15. The network of claim 14 wherein the first redirection processor is operable to send the information to the second redirection processor, the second redirection processor assigned to receive the information from the first redirection processor.

16. The network of claim 10 wherein the first redirection processor is operable to broadcast the information in a Transmission Control Protocol (TCP) format to a plurality of redirection processors, including the second redirection processor.

17. The network of claim 10 wherein the first redirection processor is operable to broadcast the information in a User Datagram Protocol (UDP) format to a plurality of redirection processors, including the second redirection processor.

18. A data information network for providing network processing associated with a plurality of users, the network comprising:
- (a) at least first and second processors at a substantially same geographic location applying substantially the same application and operating at substantially the same time;
- (b) a first load processor operatively connected to the first and second processors;
- (c) a second load processor located at a geographically disparate location from the first load processor, said second load processor operable to receive load information from the first load processor, wherein the load information comprises information from the first and second processors selected from the group of: availability, processor usage, data storage usage and combinations thereof and wherein the load information further comprises Management Information Base (MIB) data; and
- (d) wherein the first load processor is operative to distribute requests from any one of the plurality of users received by the data information network to one of the first and second processors in response to said load information.

19. The network of claim 18 further comprising at least two data storage devices storing mirrored data associated with the application, said at least two data storage devices operatively connected to each of said first and second processors.

20. The network of claim 18 wherein said second load processor is operative at a same time as said first load processor.

21. The network of claim 18 wherein the first and second load processors are operable to apply weighting factors to said load information; and wherein said distribution is responsive, in part, to said weighting factors.

22. The network of claim 18 wherein the first load processor is further operative to provide said load information to at least a third load processor, the third load processor associated with a network access point.

23. The network of claim 22 wherein the load information is a variable provided in response to a means selected from the group of: means for sending said load information in a Transmission Control Protocol format, means for sending said load information in a User Datagram Protocol format, and combinations thereof.

24. A method of providing Internet or Intranet processing and stored data access associated with a plurality of users in a data information network, the method comprising the steps of:
- (a) applying substantially the same application associated with a plurality of users in at least first and second processors, the first and second processors located at a substantially the same geographic location;
- (b) operating the first and second processors at substantially the same time;
- (c) collecting load information from said first and second processors with a first load processor, wherein said load information comprises information selected from the group of: availability, processor usage, data storage usage and combinations thereof and wherein the load information further comprises Management Information Base (MIB) data;
- (d) providing a second load processor located at a geographically disparate location from the first load processor, said second load processor operable to receive said load information from the first load processor; and (e) distributing requests from any one of the plurality of users received by the data information network to one of the first and second processors in response to said load information residing on said first and second load processors.

25. The method of claim 24 further comprising the step (f) of storing mirrored data associated with the application in at least two data storage devices, said at least two data storage devices operatively connected to each of said first and second processors.

26. The method of claim 24 wherein the step (d) comprises operating the second load processor at a same time as and in parallel to said first load processor.

27. The method of claim 24 wherein the step (e) comprises applying weighting factors to said load information.

28. The method of claim 24 further comprising the step (f) of providing said load information to at least third and fourth load processors in IP traffic data paths, the third and fourth load processors associated with first and second network points, respectively.

29. The method of claim 28 wherein the step (f) comprises providing the load information as a variable with a method selected from the group of:
 (e1) querying an assigned neighbor load processor;
 (e2) broadcasting the variable in a Transmission Control Protocol format;
 (e3) broadcasting the variable in a User Datagram Protocol format; and
 (e4) combinations thereof.

30. The method of claim 24 wherein one of said requests corresponds to a source address, the method further comprising the step (f) of distributing subsequent IP requests corresponding to the source address to the same of the first and second processors as the one of said requests.

31. The method of claim 30 wherein the step (f) comprises directing subsequent IP requests in response to the application.

32. A network architecture for redirecting network traffic, the architecture comprising:
 (a) a plurality of geographically disparate address processors in a plurality of network traffic paths, wherein each of said address processors is operable to receive load information from any of said other address processors;
 (b) a plurality of application servers operatively connected to the plurality of network traffic paths, the application servers applying, in part, substantially the same application, wherein the plurality of application servers comprise geographically disparate application servers;
 (c) wherein the address processors direct network traffic to particular application servers in response to said load information;
 (d) additional address processors associated with each geographically disparate application server, wherein each geographically disparate application server comprises a plurality of additional application servers applying, in part, the substantially the same application; and
 (f) wherein the additional address processors direct network traffic directed to the geographically disparate application servers to particular additional application servers in response to additional application server load information, wherein the additional application server load information comprises Management Information Base (MIB) data.

33. The architecture of claim 32 wherein the address processors are associated with network access points.

34. The architecture of claim 32 wherein the load information comprises a plurality of variables, each variable associated with one of the plurality of application servers.

35. The architecture of claim 32 wherein the load information is shared between plurality of address processors and the plurality of additional address processors by a means selected from the group of: means for querying an assigned neighbor address processor, means for querying an assigned additional address processor, means for broadcasting load information in a Transmission Control Protocol format, means for broadcasting load information in a User Datagram Protocol format, and combinations thereof.

36. A method for redirecting network traffic in a network, the method comprising the steps of:
 (a) routing at least first and second network traffic datagrams through at least first and second address processors, respectively, in at least first and second network traffic paths, respectively, wherein said second address processor is operable to receive load information from said first address processor and wherein said second address processor is located at a geographically disparate location from said first address processor;
 (b) applying, in part, substantially the same application with at least first and second application servers, each of the first and second application servers operatively connected to the first and second network traffic paths, wherein the first and second application servers comprise geographically disparate application servers;
 (c) directing with the first and second address processors the first and second network traffic datagrams to one of the first and second application servers in response to said load information;
 (d) providing an additional address processors associated with each geographically disparate application server, wherein the first and second application server each comprise a plurality of additional application servers applying, in part, the substantially the same application; and
 (e) directing any of the at least the first and second IP traffic datagram directed to each of the geographically disparate applications servers to a particular one of the associated additional application servers in response to additional application server load information, wherein the additional application server load information comprises Management Information Base (MIB) data.

37. The method of claim 36 wherein the step (a) comprises routing the at least first and second network traffic datagrams through the at least first and second address processors, respectively, associated with first and second network access points, respectively.

38. The method of claim 36 wherein said load information comprises at least a first variable and a second variable associated with the first and second application servers, respectively.

39. The method of claim 38 wherein the first and second variables are selected from the group of: a data rate, availability, round trip time information, and combinations thereof.

40. The method of claim 36 wherein said MIB comprises data selected from the group of: availability, processor usage, data storage usage and combinations thereof.

41. The method of claim 36 further comprising the step (f) of sharing load information between the first, second and additional address processors by a method selected from the group of:

(f1) querying an assigned neighbor address processor;

(f2) querying an assigned additional address processor;

(f3) broadcasting load information in a Transmission Control Protocol format;

(f4) broadcasting load information in a User Datagram Protocol format; and (f5) combinations thereof.

* * * * *